Dec. 18, 1962     H. C. BIEG     3,068,574
SUN SIMULATOR FOR ARCHITECTS
Filed Dec. 7, 1961     2 Sheets-Sheet 1
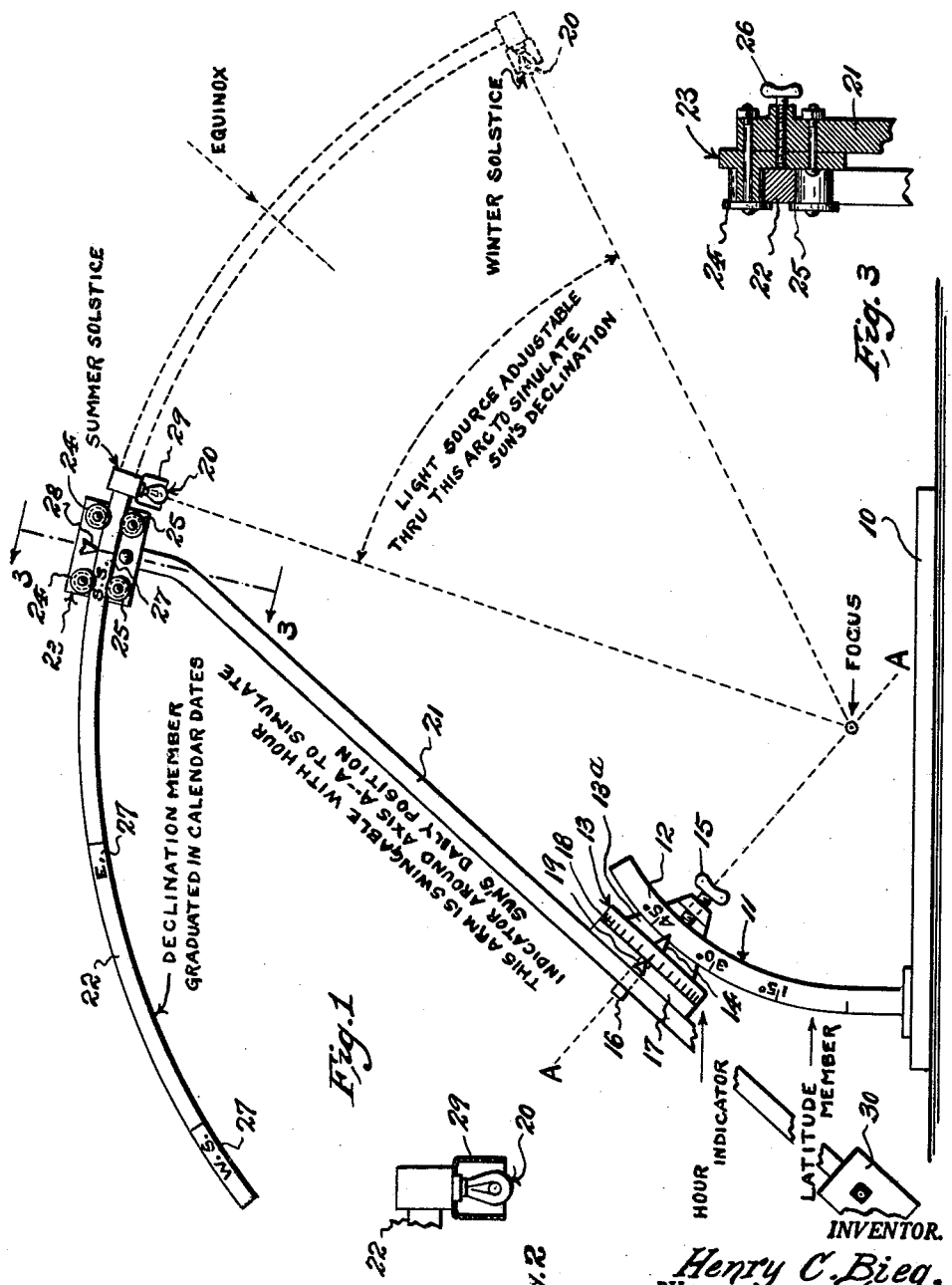
INVENTOR.
Henry C. Bieg,
BY Dudley B. Howard
Attorney

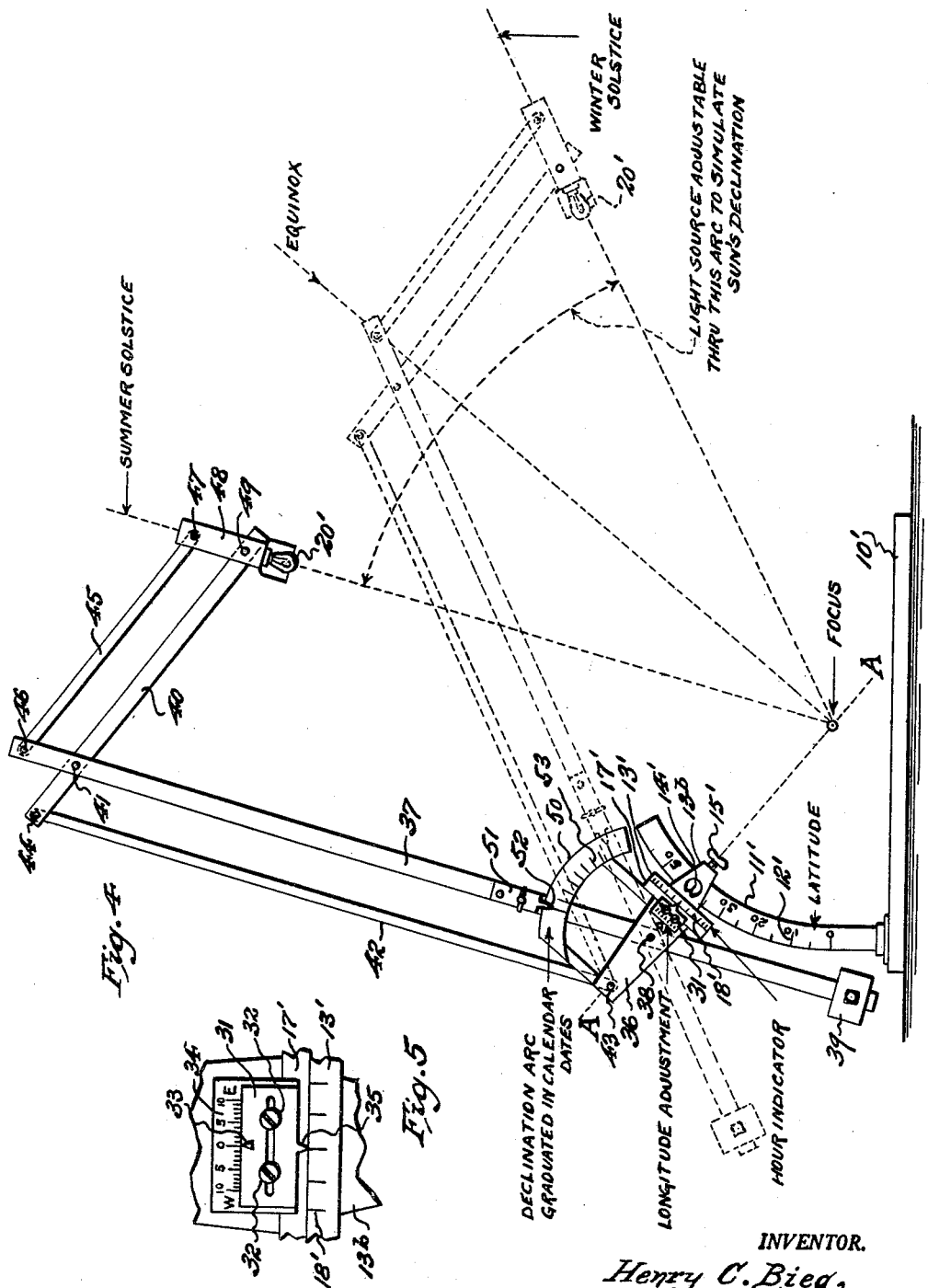

United States Patent Office 3,068,574
Patented Dec. 18, 1962

3,068,574
SUN SIMULATOR FOR ARCHITECTS
Henry C. Bieg, 24 Essex Road, Chatham, N.J.
Filed Dec. 7, 1961, Ser. No. 158,939
14 Claims. (Cl. 33—1)

This invention relates in general to architectural appliances and instruments, and has particular reference to a device for use by architects and designers to aid them in determining the future effects which the sun will have on a planned building structure at some selected site at various times of the day in any month of a year.

To be more explicit, the invention includes a flat baseplate which is portable and adapted to be mounted for temporary use in its intended capacity on the horizontal top surface of a desk, table or drawing board. This baseplate has a compass diagram delineated on its top surface for use in orienting a scale model of the planned building structure to correspond to the intended compass bearings of the walls of the latter. Added to the baseplate are articulated and adjustable means to support a lamp simulating the actual sun in various selected positions precisely corresponding to those successively occupied by the sun in its apparent course about the earth from season to season and hour to hour during each year and day.

With an appliance of the kind thus briefly described, an architect or designer may examine the light and shadows cast upon the scale model by the sun-simulating lamp and thereby determine the probable effects of sunlight upon the planned building structure.

Such examination is of value to architects and designers in the following respects:

(a) for determining the efficacy of sunshades, eaves and similar projections in blocking sunlight from entering windows, porches and other living areas;

(b) for observing the appearance of buildings as affected by the lights and shadows from sunlight when the sun assumes various positions; and (c) for ascertaining the exposure of various faces of buildings to the sun, as an aid to heat gain calculations in the design of air conditioning systems.

A further useful feature of such a device is its suitability for use as an aid to instruction in astronomy and navigation. For instance, it can be employed to demonstrate the apparent motion of the sun with respect to a point on the earth's surface, and provides a method of practicing the determination of latitude and longitude by measuring the altitude and azimuth of the sun.

I am aware of a similar device in the prior art, but it possesses numerous disadvantages. In the first place, it is large and cumbersome and not portable. It is intended to stand on the floor and includes a table to mount the architectural model to be examined under its adjustably supported floodlight. Moreover, the adjustable floodlight supporting mechanism is complicated and arranged both above and below the table, and includes a motor to make the adjustments.

It, therefore, is the primary object of my present invention to provide a greatly simplified sun simulator device which is smaller in size than the prior art device just mentioned, is readily portable, is adapted to be mounted upon an architect's table or drawing board for support with none of its articulated parts extending below the said support, and is capable of being collapsed for convenient storage in a closet or locker when not in use.

Another object is to incorporate in the articulated suspension means for the simulated sunlight source novel means to adjust for any difference between the longitude of the building location under study and the base meridian of its time zone, i.e. the meridian along which clock time is the same as true solar time. For example, eastern standard time is true solar time along the 75th meridian, whereas in Columbus, Ohio (longitude 83) eastern standard time is 32 minutes later than solar time. Consequently, without this longitude correction, the lamp of my sun simulater would not accurately assume the sun's position with respect to local time at Columbus, Ohio.

Still further objects, advantages and features of my improved device will become apparent as the following specific description is read in connection with the accompanying drawings, in which:

FIG. 1 is a side elevational view, partly broken away, of one embodiment of my invention, showing the supported lamp in a position corresponding to the position of the sun at the Summer Solstice in solid lines and at the Winter Solstice in broken lines; FIG. 2 is a fragmentary detail view, partly in section, of the lamp and its beam-directing shield; and FIG. 3 is a cross-section on line 3—3 of FIG. 1.

FIG. 4 is a view similar to FIG. 1 showing the preferred embodiment of the invention; and, FIG. 5 is an enlarged, fragmentary side elevational view of the hour indicator and longitude adjustment means.

Referring now in detail to the drawings, wherein like reference characters designate corresponding parts in the several views, an earlier embodiment of the invention is shown in FIGS. 1 to 3, inclusive.

In accordance with this embodiment, a flat baseplate 10, which in plan view may be square, round, or of any other suitable configuration, is provided to support the fixed and movable elements of my instrument and is adapted to rest upon a table, drawing board, or other available horizontal surface. Baseplate 10, in turn, is intended to support the scale model (not shown) of a building to be examined with respect to light and shadows cast by the sun at various times of the day and year, and bears on its upper surface a compass diagram (not shown) to facilitate orientation of the model to correspond to the compass-bearing arrangement of the actual building represented by the model.

At a position directly above the center of the compass diagram on baseplate 10 and at a height above the latter approximating the center of the model building structure there is an imaginary focal point, designated as "Focus" in the drawings. Surmounting baseplate 10 near one side edge thereof is a stationary arcuate latitude member 11, which is arranged in a vertical plane intersecting the focal point just described and in concentric relation thereto coincident with the vertical plane of the north-south axis of the compass diagram on baseplate 10. A scale 12 graduated in degrees of latitude is delineated on the flat front face of latitude member 11 with its point of origin in a horizontal plane intersecting focal point Focus.

An hour circle disc 13 is mounted on arcuate latitude member 11 at a tangent to the convex face of said member and is arranged with its axis intersecting focal point Focus to simulate the rotational axis of the earth. An integral guide member 13a is formed on disc 13 to embrace latitude member 11 in a manner to permit said disc to slide along said member without rotation. An index pointer 14 is provided on disc 13 in a position to traverse latitude scale 12 on latitude member 11, and suitable means, such as setscrew 15, is provided to secure said disc in adjusted position for the duration of each model examination.

An axle shaft 16 extends axially upward from disc 13 and serves to rotatably mount a rotatable hour circle disc 17 coaxially in relation to said non-rotatable disc for rotational adjustment in hour-angle about the simulated earth's axis. A scale 18 graduated in hours of the day is delineated on the peripheral edge of disc 13 and an index pointer 19 is provided on rotatable disc 17 to traverse said scale 18.

Non-rotatable disc 13 and rotatable disc 17, with their respective hour scale 18 and index pointer 19 constitute an hour indicator for cooperation with articulated means to mount a lamp (preferably electric) 20 in a position of declination north or south of the celestial equator, which means will now be described.

An hour arm 21 is fixedly secured medially in radial relation to rotatable disc 17 and supports at its upper end an arcuate declination member 22, which is arranged concentric to focal point Focus and mounted for lengthwise adjustment in guide member 23 between suitable low-friction bearing means, such as respective upper and lower pairs of roller bearings 24 and 25. Declination member 22 preferably is rectangular in cross-section to prevent rotational displacement from its concentric relation to focal point Focus. Suitable means, such as setscrew 26, is provided on guide member 23 to clamp declination member 22 in any desired adjusted position with respect to said member.

Declination member 22 has suitably spaced indicia 27 "S.S.," "E.," and "W.S." marked on the front face thereof to indicate, respectively, the summer solstice, equinox, and winter solstice. An index pointer 28 is provided on declination member 23 to indicate the position at which the appropriate indicia 27 must be set for location of lamp 20 at any desired declination. A shield 29 is provided on lamp 20 to direct the beam of light in concentration upon focal point Focus.

A counterweight 30 is longitudinally adjustable on the lower end portion of hour arm 22 to permit counterbalancing of said arm and the load supported at its upper end (elements 20—22—23).

Lamp 20, which simulates the sun, preferably is a combined light bulb and socket unit mounted on one end of declination member 22 and connected by electrical conduction means (not shown) to a source of current.

Analyzing the device as a whole, it will be observed that there are means for two principal adjustments of lamp 20, viz. (1) pre-setting adjustment means constituted by latitude member 11 and declination member 22, and (2) azimuthal transitional adjustment means constituted by rotatable hour circle disc 17 and hour arm 21.

*Operation of the Device*

Operational use of the earlier embodiment of my invention will now be described.

First, a scale model of the building structure under consideration is placed on baseplate 10 at such a position that its center will be located as nearly as practicable to coincide with focal point Focus. At the same time, the model will be oriented by compass bearings so that the respective walls of the model are facing in the same directions as corresponding walls of the planned building structure. Then, because the latitude of the building site is known and will not change during examination of the model, non-rotatable hour circle disc 13 is slid along latitude member 11 into the appropriate position according to scale 12 and pointer 14 and is secured in this position semi-permanently by clamping setscrew 15. The time of the year also is known and will not change appreciably during the examination, so declination member 22 is adjusted longitudinally in guide member 23 until the declination is correct according to scale indicia 27 and pointer 28. This adjustment is set securely by use of setscrew 26. Finally, a series of hour adjustments are made consecutively by swinging rotatable hour circle disc 17 and supported hour arm 21 in hour-angle. Each hour setting may be determined by reference to scale 18 and pointer 19. It may be desired to skip back and forth through the simulated hours of sunshine during the day, so each setting may be held only momentarily. Therefore, no means has been provided to clamp rotatable hour circle disc 17 in adjusted position.

In each hourly position, lamp 20 will cast light on the scale model in a manner corresponding to actual sunlight cast upon the planned building structure at its site at the same time of year and day, which will enable the architect or designer to examine the lighted areas and shadows and even to photograph them for future reference.

In FIGS. 4 and 5, there is represented a modified form of my invention which is presently preferred due to the simplicity and operational efficiency of its declination adjustment supporting means for the sun-simulating electric lamp, and also because of incorporation in the hour indicator of means by which a longitude adjustment correction will be applied automatically to each hour circle adjustment to allow for any difference at the building site between clock time and solar time. This second feature will be described more fully later herein.

In the preferred embodiment, the baseplate 10' remains unchanged in construction and so does arcuate latitude member 11' both in form and in its concentric, co-planar relation to focal point Focus. As in the earlier embodiment, latitude member 11' bears a scale 12' graduated in degrees of latitude on its front face. Non-rotatable hour circle disc 13' is mounted by its integral guide member 13b to slide longitudinally on latitude member 11' while maintaining its axial alignment with focal point Focus. An index pointer 14' on fixed hour circle disc 13' traverses latitude scale 12' to indicate latitude adjustment and setscrew 15' is provided to clamp non-rotatable disc 13' in adjusted position on latitude member 11'. An axle shaft (concealed in the drawing) projects upwardly from non-rotatable hour circle disc 13' with its axis, which simulates the earth's rotational axis, intersecting focal point Focus. Rotatable hour circle disc 17' is rotatably mounted on the axle shaft of non-rotatable hour circle disc 13' as before, but a difference now will be apparent.

Instead of providing an index pointer on rotatable hour circle disc 17' to traverse the peripherally located hour scale 18' on non-rotatable hour circle disc 13', a curved longitude correction plate 31 is mounted for circumferential adjustment on rotatable hour circle disc 17' with screw means 32 to secure said plate fixedly in adjusted position. Two pointers are provided on longitude correction plate 31. An upwardly directed first pointer 33 traverses a scale 34 graduated in degrees of longitude on rotatable hour circle disc 17' and a downwardly directed second pointer 35 traverses the hour scale 18' on non-rotatable hour circle disc 13'. Longitude scale 34 has a central zero point of origin and is graduated in degrees east and west of that point. The function of this longitude correction means will be described fully later herein under the heading "Operation of the Device."

Rotatable hour circle disc 17' is provided with an axially upwardly extending mounting plate 36 to which is medially pivotally connected the primary combined hour-declination arm 37 of articulated means to adjustably support sun-simulating lamp 20'. Primary arm 37 is pivoted at a point 38 located nearer to its lower end than its upper end and an adjustable counterweight 39 is mounted on the said lower end. A secondary hour-declination arm 40 is pivoted at a point 41 nearer to its left end than the right end to primary hour-declination arm 37 in slightly spaced relation to the upper end of the latter.

A primary link bar 42 parallels primary hour-declination arm 37 and has its lower end pivotally connected at 43 to the upper left end of mounting plate 36 on rotatable hour circle disc 17', whereas the upper end of said link bar is pivotally connected at 44 to the upper left end of secondary hour arm 40. A secondary link bar 45 arranged parallel to secondary hour-declination arm 40 has its left end pivotally connected at 46 to the upper end of primary hour-declination arm 37 and its right end pivotally connected at 47 to the upper end of a short tertiary link bar 48 which parallels primary hour-declination arm 37 and has its lower end pivotally connected at 49 to the right end of secondary link 40.

Sun-simulating lamp 20' is directly supported at the lower end of tertiary link bar 48 and has its beam directing shield 30' arranged in alignment with focal point Focus at all times regardless of the angular adjustments of primary arm 37 in hour-angle about the axis of rotatable hour circle disc 17' or in declination about the pivot point 38, due to the pantograph-like arrangement of hour-declination arms 37—40 and link bars 42—45—48.

An arcuate declination indicator plate 50 is fixedly mounted on mounting plate 36 of rotatable hour circle disc 17' in co-planar relation to said mounting plate, and a clamp device 51 carried by primary arm 37 has an index pointer 52 adapted to traverse a scale 53 graduated in dates on declination indicator plate 50.

Operation of the Device

Assuming, by way of example, that the planned building is to be built in Columbus, Ohio, the scale model will be oriented at focal point Focus on baseplate 10' by use of the compass diagram so that the respective walls of the model will face in the same directions as the walls of the actual building. Then, non-rotatable hour circle disc 13' is set on latitude member 11' and clamped semi-permanently at a position corresponding to the latitude of Columbus, Ohio. The next step is to adjust and clamp longitude correction plate 31 semi-permanently in a position to apply 8 degrees of correction westward from the zero point of scale 34 carried by rotatable hour circle disc 17'. When this pre-setting has been effected, pointer 35 can thereafter be set at the clock time reading on hour scale 18' for each change in hour of the day without any further adjustment of longitude correction plate 31, because the necessary correction will be applied to all hour settings.

A pre-setting for the calendar date when the examination is being conducted may be made by swinging primary hour-declination arm 37 until pointer 52 registers with the desired reading on scale 53 on declination indicator plate 50. Clamp device 51 is then used to lock primary hour-declination arm 37 in adjusted declinational position. For instance, assuming that the examination is to occur at the time of the summer solstice, the pre-setting of primary arm 37 will be as represented in solid lines in FIG. 4. The pre-setting for examination at the time of the winter solstice is shown, by way of example, in broken lines.

The device having thus been pre-set for momentarily fixed conditions such as latitude, declination and longitude correction, the hourly changes in position of the sun in its apparent course around the earth may now be simulated. This is done by swinging primary hour-declination arm 37 and integral rotatable hour circle disc 17' about the rotational axis of said disc until pointer 35 registers successively with the desired points of time on scale 18'.

While the invention has been illustrated and described with respect to only two particular embodiments thereof, it will be understood that it is intended to cover all changes and modifications of the embodiments shown which do not constitute departures from the spirit of the invention and scope of the appended claims.

I claim:

1. A device for use by architects and designers to aid in determining the future effects which the sun will have on a planned building structure at some selected site at various times of the day in any month of the year comprising:
    a flat portable baseplate adapted to be supported upon a horizontal surface, such as a table top, and in turn to support in compass-oriented position a scale model of the planned building structure;
    a light-beam projecting sun-simulating lamp; and
    articulated means attached to the baseplate and being located entirely above the latter to support the said lamp in adjusted positions while maintaining the axis of the light beam directed downward in intersecting relation to a focal point slightly elevated above the center of said baseplate where the scale model is positioned, said articulated lamp supporting means including:
        an arcuate latitude member fixedly mounted upon the baseplate and arranged concentric to said focal point and with said point lying in the plane of said latitude member, which bears a longitudinal scale graduated in degrees of latitude having its point of origin on a level with said focal point;
        a fixed non-rotatable hour circle disc mounted on the arcuate latitude member for longitudinal sliding adjustment thereon and being arranged with its axis which simulates the rotational axis of the earth intersecting said focal point, said non-rotatable hour circle disc having an index pointer traversing the latitude scale on the latitude member;
        means carried by the rotatable hour circle disc to support the sun-simulating lamp for hour-angle adjustment corresponding to the hourly movement of the sun with respect to the earth and declinational adjustment in declination, said means being constructed and arranged to maintain the axis of the light beam of said lamp continually intersecting the focal point.

2. The invention defined in claim 1, wherein means is added to indicate the degrees of hour-angle and declinational adjustment of the sun-simulating lamp.

3. The invention defined in claim 1, wherein the adjustable lamp supporting means carried by the rotatable hour circle disc includes:
    a diametrical hour arm medially affixed to said rotatable hour circle disc for swinging adjustment in hour-angle;
    a guide member affixed to the upper end of said hour arm; and
    an arcuate declination member longitudinally slidable in said guide member and being arranged concentric to the focal point and in co-planar relation thereto, the sun simulating lamp being attached to said declination member.

4. The invention defined in claim 3, to which is added a counterweight longitudinally adjustable on the lower end portion of the hour arm.

5. The invention defined in claim 4, wherein means is added to indicate the degree of hour-angle adjustment of the hour arm and of altitudinal adjustment of the declination member.

6. The invention defined in claim 1, wherein the adjustable lamp supporting means carried by the rotatable hour circle disc includes:
    a pantograph-like arrangement of arms and link bars including
        a primary hour-declination arm medially pivotally connected to the rotatable hour circle disc for swinging adjustment about the axis thereof and also in the plane of the axis of said disc; and
        a secondary hour-declination arm pivotally connected to the upper end of said primary hour-declination arm for swinging adjustment in the plane of the axis of the rotatable hour circle disc, the sun-simulating lamp being supported by the free end of said secondary hour-declination arm and the said linkage being constructed and arranged to maintain said lamp with the axis of its light beam continually intersecting the focal point.

7. The invention defined in claim 6, wherein means is added to indicate the degree of adjustment of the sun-simulating lamp in hour-angle and in declination.

8. The invention defined in claim 7, wherein a counterweight is longitudinally adjustable on the lower end portion of the primary hour-declination arm.

9. The invention defined in claim 1, wherein the articulated lamp-supporting means carried by the rotatable hour circle disc includes:
an integral mounting plate extending axially outward and upward from the rotatable hour circle disc;
a pantograph-like arrangement of arms and link bars including
a primary hour-declination arm medially pivotally connected to the mounting plate of the rotatable hour circle disc in inwardly spaced relation to the free end thereof for swinging adjustment in azimuth hour-angle about the axis of said disc and also swinging adjustment in the plane of said axis;
a secondary hour-declination arm pivotally connected in slightly spaced relation to the outer end thereof to the primary hour-declination arm in slightly inwardly spaced relation to the outer end of the latter for swinging adjustment only in the plane of the axis of the rotatable hour circle disc;
a primary link bar arranged in constant parallelism to the primary hour-declination arm and having its lower end pivotally connected to the free end of the mounting plate on the rotatable hour circle disc and its upper end pivotally connected to the outer end of the secondary hour-declination arm;
a secondary link bar arranged constantly parallel to the secondary hour-declination arm and having its outer end pivotally connected to the upper free end of the primary hour-declination arm; and
a tertiary link bar arranged constantly in alignment with the said focal point with the sun simulating lamp mounted on the inner end thereof and being pivotally connected terminally to the free inner ends of the secondary hour-declination arm and link bar.

10. The invention defined in claim 9, wherein means is added to indicate the degree of declination adjustment of the primary hour-declination arm.

11. The invention defined in claim 10, wherein the declination adjustment indicating means comprises an arcuate plate rigid with the mounting plate of the rotatable hour circle disc and bearing a declination scale on its front face; and a pointer carried by said primary hour-declination arm to traverse said scale, said arcuate declination indicating plate being arranged concentric with the point of pivotal connection between the primary hour-declination arm and the mounting plate of the rotatable hour circle disc.

12. The invention defined in claim 11, to which is added means to releasably clamp the declination indicating plate and primary hour-declination arm in adjusted position.

13. The invention defined in claim 1, wherein the non-rotatable hour circle disc bears a peripheral scale graduated in hours; wherein a circumferentially adjustable longitude correction plate is carried by the rotatable hour circle disc and is provided with a second pointer traversing said hour scale on the non-rotatable hour circle disc; wherein a circumferential scale graduated in degrees of longitude is delineated on the rotatable hour circle disc; and wherein a first pointer on the longitude correction plate is arranged to traverse said longitude scale on the rotatable hour circle disc.

14. The invention defined in claim 13, wherein means is provided to secure the longitude correction plate releasably in circumferentially adjusted position.

References Cited in the file of this patent

UNITED STATES PATENTS

| | | |
|---|---|---|
| 2,287,594 | Barbagelata | June 23, 1942 |
| 2,305,894 | Park | Dec. 22, 1942 |
| 2,478,315 | Pollman | Aug. 9, 1949 |
| 2,884,697 | Sylvester | May 5, 1959 |